United States Patent
Park

(10) Patent No.: US 9,414,461 B2
(45) Date of Patent: Aug. 9, 2016

(54) DC-DC CONVERTER AND ORGANIC LIGHT EMITTING DISPLAY DEVICE INCLUDING THE SAME

(71) Applicant: SAMSUNG DISPLAY CO., LTD., Yongin, Gyeonggi-Do (KR)

(72) Inventor: Sung-Cheon Park, Yongin (KR)

(73) Assignee: SAMSUNG DISPLAY CO., LTD., Yongin, Gyeonggi-do (KR)

( * ) Notice: Subject to any disclaimer, the term of this patent is extended or adjusted under 35 U.S.C. 154(b) by 98 days.

(21) Appl. No.: 14/446,641

(22) Filed: Jul. 30, 2014

(65) Prior Publication Data

US 2015/0061540 A1    Mar. 5, 2015

(30) Foreign Application Priority Data

Sep. 3, 2013   (KR) .................. 10-2013-0105412

(51) Int. Cl.
*H05B 33/08*    (2006.01)
*H02M 3/158*    (2006.01)
*H02M 1/00*    (2006.01)
*G09G 3/32*    (2016.01)

(52) U.S. Cl.
CPC ......... *H05B 33/0896* (2013.01); *H02M 3/1588* (2013.01); *G09G 3/3233* (2013.01); *G09G 2330/02* (2013.01); *H02M 3/158* (2013.01); *H02M 2001/0054* (2013.01); *Y02B 70/1466* (2013.01); *Y02B 70/1491* (2013.01)

(58) Field of Classification Search
None
See application file for complete search history.

(56) References Cited

U.S. PATENT DOCUMENTS

| 5,514,935 | A | * | 5/1996 | Oda | ............ | H05B 41/2886 315/308 |
|---|---|---|---|---|---|---|
| 6,054,816 | A | * | 4/2000 | Jurek | ............ | H02M 3/158 315/209 R |
| 6,069,454 | A | * | 5/2000 | Bouwman | ......... | H05B 41/2882 315/209 R |
| 6,232,752 | B1 | * | 5/2001 | Bissell | ............ | H02M 3/1582 323/222 |
| 7,038,295 | B2 | * | 5/2006 | Hadizad | ........... | H01L 27/0605 257/329 |
| 7,994,737 | B2 | * | 8/2011 | Tamegai | ............ | G03B 15/05 315/177 |

(Continued)

FOREIGN PATENT DOCUMENTS

| KR | 10-0732851 B1 | 6/2007 |
|---|---|---|
| KR | 10-2008-0068428 A | 7/2008 |
| KR | 10-2009-0021742 A | 3/2009 |

*Primary Examiner* — Crystal L Hammond
(74) *Attorney, Agent, or Firm* — Lee & Morse, P.C.

(57) ABSTRACT

An organic light emitting display device includes a DC-DC converter to supply first and second voltages to one or more pixels. The DC-DC converter includes a first voltage supply to convert an input voltage to a first voltage and a second voltage supply to convert the input voltage to a second voltage. The first and second voltages are coupled to opposing ends of the one or more pixels. The first voltage supply includes a first inductor between a first input terminal and first node, a first transistor between the first node and a reference potential, a second transistor between the first node and first output terminal, a first diode between the first node and a second node, a second diode between the second node and first output terminal, and a first switch between the second node and first output terminal.

19 Claims, 3 Drawing Sheets

(56) References Cited

U.S. PATENT DOCUMENTS

| | | | | |
|---|---|---|---|---|
| 8,111,007 B2* | 2/2012 | Chung | H05B 33/0818 | 315/291 |
| 8,853,957 B2* | 10/2014 | Ge | H05B 33/0815 | 315/247 |
| 8,901,837 B2* | 12/2014 | Huang | G09G 3/3406 | 315/210 |
| 2006/0028186 A1* | 2/2006 | Yan | H02M 3/155 | 323/225 |
| 2006/0181904 A1* | 8/2006 | Lee | H02M 3/158 | 363/21.12 |
| 2008/0122291 A1* | 5/2008 | Uchimoto | H02M 3/1584 | 307/31 |
| 2009/0009104 A1* | 1/2009 | Doi | H02M 3/1582 | 315/291 |
| 2009/0058311 A1 | 3/2009 | Eom | | |
| 2009/0167264 A1* | 7/2009 | Bayer | G09G 3/3208 | 323/267 |
| 2009/0251118 A1* | 10/2009 | Omi | H02M 1/36 | 323/282 |
| 2010/0134084 A1* | 6/2010 | Miyamae | H02M 3/157 | 323/283 |
| 2012/0127213 A1* | 5/2012 | Park | G09G 3/006 | 345/690 |
| 2012/0133291 A1* | 5/2012 | Kitagawa | H05B 33/0812 | 315/186 |
| 2013/0020867 A1* | 1/2013 | Hughes | H02M 3/33507 | 307/17 |
| 2014/0145692 A1* | 5/2014 | Miyamae | H02M 3/158 | 323/271 |
| 2014/0232275 A1* | 8/2014 | Kwon | H01L 27/3279 | 315/161 |

* cited by examiner

DC-DC CONVERTER AND ORGANIC LIGHT EMITTING DISPLAY DEVICE INCLUDING THE SAME

CROSS-REFERENCE TO RELATED APPLICATION

Korean Patent Application No. 10-2013-0105412, filed on Sep. 3, 2013, and entitled, "Dc-Dc Converter and Organic Light Emitting Display Device Including The Same," is incorporated by reference herein in its entirety.

BACKGROUND

1. Field

One or more embodiments described herein relate to a display device.

2. Description of the Related Art

A variety of flat panel displays have been developed. Examples include liquid crystal displays, field emission displays, plasma display panels, and an organic light emitting display devices. Organic light emitting displays generate images using organic light emitting diodes that emit light based on a recombination of electrons and holes in an active layer. These displays have fast response speeds and low power consumption.

SUMMARY

In accordance with one embodiment, a DC-DC converter includes a first voltage supply unit to convert an input voltage to a first voltage for input to a first output terminal, the first voltage supply unit including: a first inductor coupled between the first input terminal and a first node; a first transistor coupled between the first node and a reference potential; a second transistor coupled between the first node and first output terminal; a first diode coupled between the first node and a second node; a second diode coupled between the second node and first output terminal; and a first switch coupled between the second node and first output terminal.

An anode electrode of the first diode may be coupled to the first node, a cathode electrode of the first diode may be coupled to the second node, an anode electrode of the second diode may be coupled to the first output terminal, and a cathode electrode of the second diode may be coupled to the second node.

The first voltage supply unit may include a first controller configured to control on-off states of the first and second transistors; a first voltage divider configured to divide the first voltage for input to the first controller; and a second switch coupled between the first voltage divider and reference potential.

The first voltage supply unit may include a first discharge resistor and a third switch coupled in series between the first output terminal and reference potential.

The first voltage supply unit may include a comparator configured to compare the input voltage and first voltage and to output a signal to control the on-off states of the first switch based on the comparison. The comparator may turn on the first switch when the input voltage is less than the first voltage and may turn off the first switch when the input voltage is greater than the first voltage.

The converter may include a second voltage supply unit configured to: convert an input voltage supplied to a second input terminal to a second voltage, and output the second voltage to a second output terminal. The second voltage supply unit may include a third transistor coupled between the second input terminal and a third node; a fourth transistor coupled between the third node and second output terminal; a second inductor coupled between the third node and the reference potential; a second controller configured to control on-off states of the third and fourth transistors; a second voltage divider configured to divide the second voltage for input to the second controller; and a fourth switch coupled between the second output terminal and second voltage divider.

The second voltage supply unit may include a second discharge resistor and a fifth switch coupled in series between the second output terminal and the reference potential.

The first voltage supply unit may include a first capacitor coupled to the first output terminal, and the second voltage supply unit includes a second capacitor coupled to the first output terminal.

In accordance with another embodiment, an organic light emitting display device includes a plurality of pixels; and a DC-DC converter configured to supply first and second voltages to each of the pixels, wherein the DC-DC converter includes: a first voltage supply unit configured to convert an input voltage supplied to a first input terminal to a first voltage, the first voltage to be input to a first output terminal; and a second voltage supply unit configured to convert the input voltage supplied to a second input terminal to a second voltage, the second voltage to be output to a second output terminal.

The first voltage supply unit includes a first inductor coupled between the first input terminal and a first node; a first transistor coupled between the first node and a reference potential; a second transistor coupled between the first node and first output terminal; a first diode coupled between the first node and a second node; a second diode coupled between the second node and first output terminal; and a first switch coupled between the second node and first output terminal.

An anode electrode of the first diode may be coupled to the first node, a cathode electrode of the first diode may be coupled to the second node, an anode electrode of the second diode may be coupled to the first output terminal, an a cathode electrode of the second diode may be coupled to the second node.

The first voltage supply unit may include a first controller configured to control on-off states of the first and second transistors; a first voltage divider configured to divide the first voltage for input to the first controller; and a second switch coupled between the first voltage divider and reference potential. The first voltage supply unit may include a first discharge resistor and a third switch coupled in series between the first output terminal and the ground. The DC-DC converter may include a first capacitor coupled to the first output terminal; and a second capacitor coupled to the second output terminal.

The first voltage supply unit may include a comparator configured to compare the input voltage and first voltage, and to control an on-off state of the first switch based on the comparison. The comparator may turn on the first switch when the input voltage is less than the first voltage, and may turn off the first switch when the input voltage is greater than the first voltage.

The second voltage supply unit may include a third transistor coupled between the second input terminal and a third node; a fourth transistor coupled between the third node and the second output terminal; a second inductor coupled between the third node and the reference potential; a second controller configured to control on-off states of the third and fourth transistors; a second voltage divider configured to divide the second voltage for input to the second controller; and a fourth switch coupled between the second output terminal and second voltage divider. The second voltage supply unit may include a second discharge resistor and a fifth switch coupled in series between the second output terminal and the ground.

In accordance with another embodiment, a controller for an organic light emitting display device includes a first converter to convert an input voltage to a first voltage; a second converter to convert the input voltage to a second voltage different from the first voltage; and at least one circuit to block leakage current from flowing along a circuit path between input and output terminals, wherein the first and second voltage are coupled to opposing ends of one or more display pixels and wherein the at least one circuit is to block the leakage current based on a comparison of the input voltage and the first voltage.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
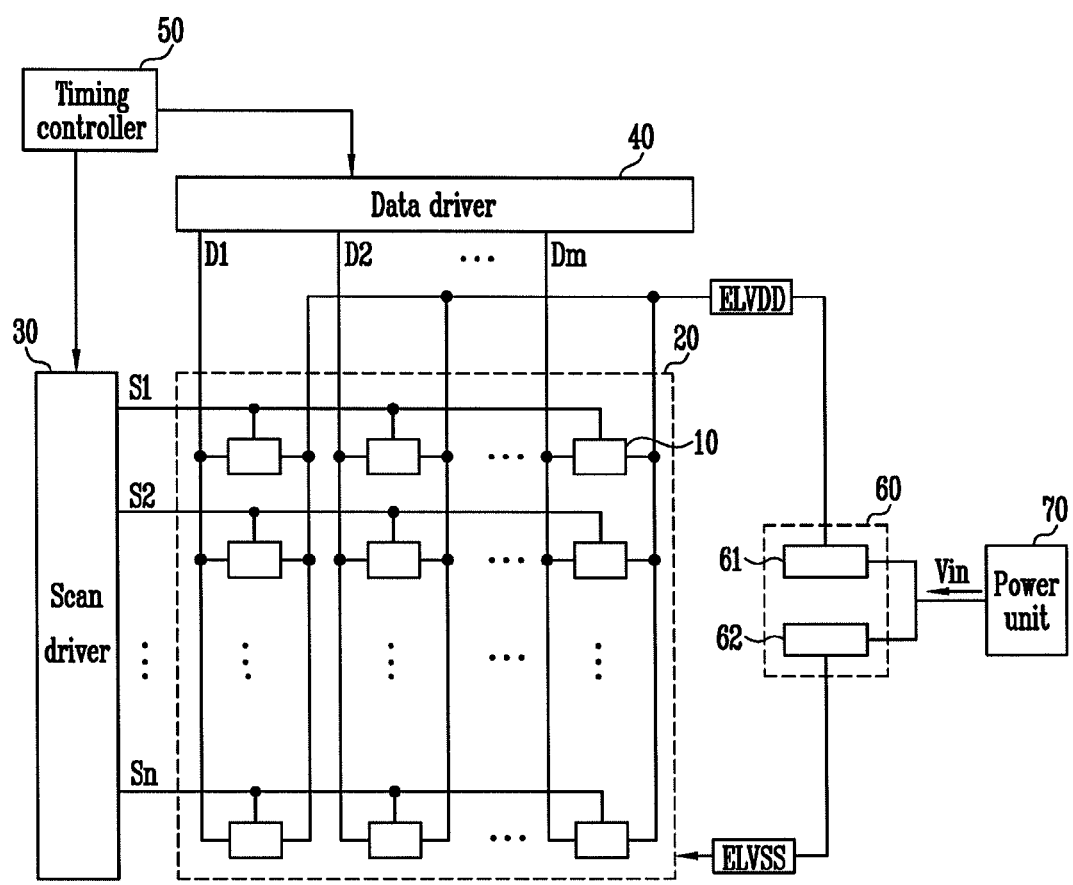
FIG. 1 illustrates an embodiment of an organic light emitting display device.

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

FIG. 1 illustrates an embodiment of an organic light emitting display device which includes a pixel unit 20, a scan driver 30, a data driver 40, and a DC-DC converter 60. The pixel unit 20 includes a plurality of pixels 10 coupled to scan lines S1 to Sn and data lines D1 to Dm. The scan driver 30 supplies a scan signal to the pixels through the scan lines S1 to Sn. The data driver 40 supplies data signals to the pixel 10 through respective ones of the data lines D1 to Dm. The DC-DC converter 60 supplies a first voltage ELVDD and a second voltage ELVSS to the pixels. The display device also includes a timing controller 50 for controlling the scan driver 30 and data driver 40.

In operation, each pixel 10 receives first and second voltages ELVDD and ELVSS from the DC-DC converter 60, and generates light corresponding to a data signal based on current flowing from the first voltage ELVDD to the second voltage ELVSS via an organic light emitting diode.

The scan driver 30 generates a scan signal under control of the timing controller 50, and supplies the scan signal to scan lines S1 to Sn.

The data driver 40 generates data signals under control of the timing controller 50, and supplies the data signals to respective ones of the data lines D1 to Dm.

When the scan signal is supplied to a scan line, pixels 10 coupled to the scan line receive data signals supplied from respective ones of the data lines D1 to Dm.

The DC-DC converter 60 (which may also be considered to be a controller) receives an input voltage Vin supplied from a power unit 70, and generates first and second voltages ELVDD and ELVSS. These voltages are supplied to the pixels 10 based on a conversion of the input voltage Vin. The first voltage ELVDD may be a positive voltage and the second voltage ELVSS may be a negative voltage. ELVDD and ELVSS may be different voltages in other embodiments.

The power unit 70 may be a battery providing DC power. Alternatively, the power unit 70 may be a rectifying device which converts AC power to DC power.

The DC-DC converter 60 includes a first voltage supply unit 61 to output first voltage ELVDD and a second voltage supply unit 62 to output second voltage ELVSS. The first voltage supply unit 61 converts input voltage Vin to first voltage ELVDD, and the second voltage supply unit 62 converts input voltage Vin to second voltage ELVSS.

Figure 2:
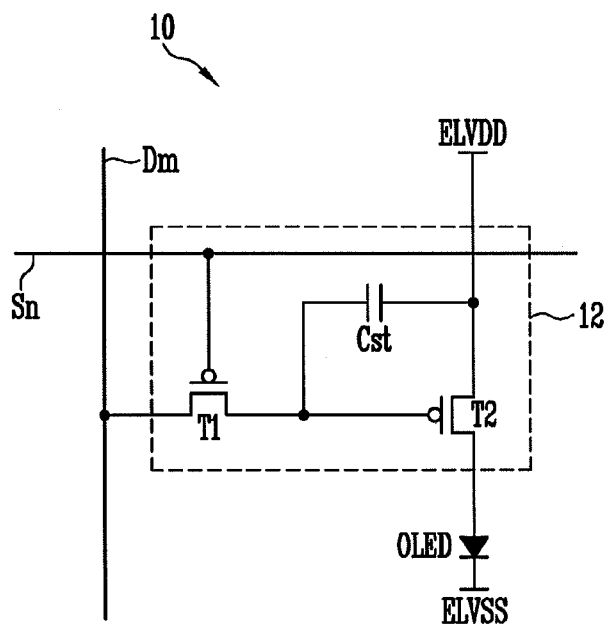
FIG. 2 illustrates an embodiment of a pixel.

FIG. 2 illustrates an embodiment of the pixel, which, for example, may be illustrative of pixels 10 in FIG. 1. For convenience of illustration, the pixel is shown to be coupled to an n-th scan line Sn and an m-th data line Dm.

Referring to FIG. 2, the pixel 10 may include a pixel circuit 12 coupled to data line Dm and scan line Sn for controlling an organic light emitting diode (OLED). An anode electrode of the OLED is coupled to pixel circuit 12, and a cathode electrode of the OLED is coupled to second voltage ELVSS. The OLED generates light with a luminance corresponding to current supplied from the pixel circuit 12.

The pixel circuit 12 controls the amount of current supplied to the OLED, based on a data signal supplied to data line Dm when a scan signal is supplied to scan line Sn. In this embodiment, pixel circuit 12 includes a second transistor T2 coupled between first voltage ELVDD and the OLED, a first transistor T1 coupled among the second transistor T2, data line Dm, and scan line Sn, and a storage capacitor Cst coupled between a gate electrode and a first electrode of second transistor T2.

A gate electrode of first transistor T1 is coupled to scan line Sn. A first electrode of first transistor T1 is coupled to data line Dm. A second electrode of first transistor T1 is coupled to one terminal of storage capacitor Cst. The first and second electrodes may be source and drain electrodes. For example, if the first electrode is a source electrode, the second electrode is a drain electrode, or vice versa.

The first transistor T1 coupled to scan line Sn and data line Dm is turned on when the scan signal is supplied to scan line Sn. The data signal from data line DM is supplied to storage capacitor Cst. The storage capacitor Cst charges a voltage corresponding to the data signal.

The gate electrode of second transistor T2 is coupled to one terminal of the storage capacitor Cst. The first electrode of second transistor T2 is coupled to the other terminal of storage capacitor Cst and first voltage ELVDD. A second electrode of second transistor T2 is coupled to the anode electrode of the OLED.

The second transistor T2 controls the amount of current flowing from the first voltage ELVDD to the second voltage ELVSS via the OLED, based on the voltage stored in storage capacitor Cst. The OLED generates light corresponding to the amount of current supplied from the second transistor T2. The pixel structure may have a different structure in other embodiments.

Figure 3:
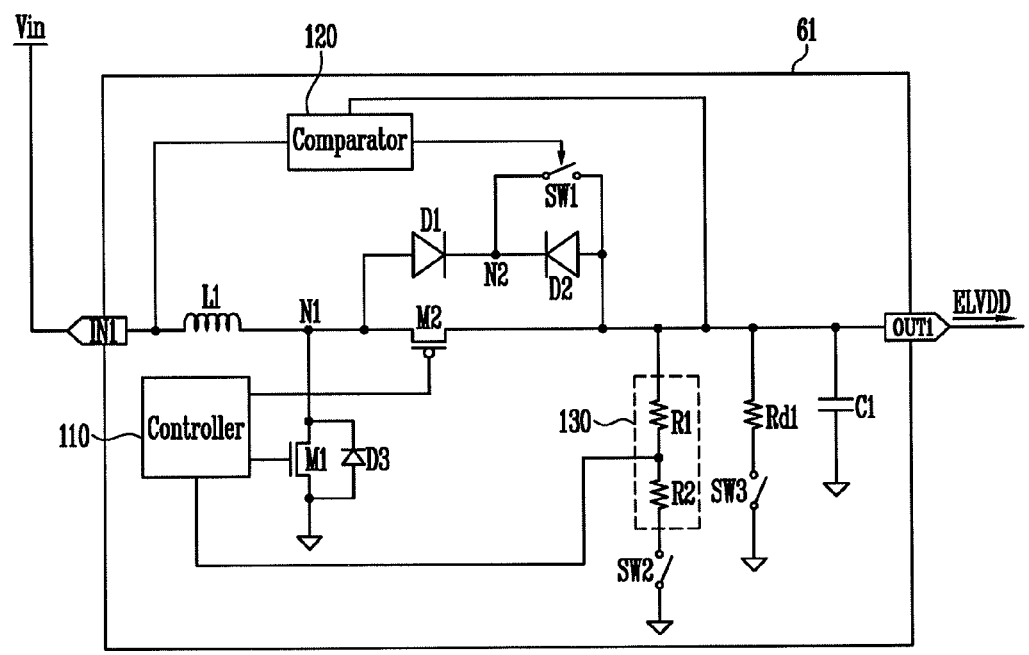
FIG. 3 illustrates an embodiment of a first voltage supply unit.

FIG. 3 illustrates an embodiment of first voltage supply unit 61, which, in this case, is a boost-type converter for boosting input voltage Vin. In this embodiment, first supply unit 61 generates a first voltage ELVDD having a positive voltage.

Referring to FIG. 3, first voltage supply unit 61 converts input voltage Vin received through a first input terminal IN1 to first voltage ELVDD, and outputs the first voltage ELVDD to a first output terminal OUT1. The first voltage supply unit 61 includes a first inductor L1, a first transistor M1, a second transistor M2, a first diode D1, a second diode D2, and a first switch SW1.

The first inductor L1 is coupled between a first node N1 and first input terminal IN1, to which the input voltage Vin is applied. The first transistor M1 is coupled between the first node N1 and ground or another reference potential. The second transistor M2 is coupled between first node N1 and first output terminal OUT1. The first diode D1 is coupled between first node N1 and a second node N2. The second diode D2 is coupled between second node N2 and first output terminal OUT1.

The first and second diodes D1 and D2 may be coupled so that the directions of the first and second diodes D1 and D2 oppose each other. For example, an anode electrode of first diode D1 may be coupled to first node N1, and the cathode electrode of first diode D1 may be coupled to second node N2. Thus, current flows from the first node N1 to the second node N2 through first diode D1.

An anode electrode of second diode D2 may be coupled first output terminal OUT1, and a cathode electrode of second diode D2 may be coupled to second node N2. Thus, current flows from first output terminal OUT1 to second node N2 through second diode D2.

The first switch SW1 is coupled between second node N2 and first output terminal OUT1. The first node N1 may be a common node of first inductor L1, first transistor M1, second transistor M2, and first diode D1. The second node N2 may be a common node of first diode D1, second diode D2, and first switch SW1. A first capacitor C1 is coupled to the first output terminal OUT1 of first voltage supply unit 61.

The first voltage supply unit 61 may also include a first controller 110 to control on-off states of first and second transistors M1 and M2. The first controller 110 controls on-off states of first and second transistors M1 and M2 to allow the input voltage Vin to be converted to first voltage ELVDD at a desired voltage level.

The first voltage supply unit 61 may also include a voltage divider 130 coupled to first output terminal OUT1 to divide the voltage of first output terminal OUT1 (e.g., first voltage ELVDD). The divided voltage may be supplied to first controller 110.

The first voltage divider 130 may include a plurality of resistors R1 and R2 coupled in series. A second switch SW2 may be installed between first voltage divider 130 and ground, in order to block current leaked through first voltage divider 130. For example, when second switch SW2 turns on, first voltage divider 130 divides the voltage of first output terminal OUT1 and supplies the divided voltage to first controller 110. When second switch SW2 turns off, leakage current flowing from the first output terminal OUT1 to ground through first voltage divider 130 is blocked.

The first controller 110 receives the divided voltage and controls a duty cycle ratio of first and second transistors M1 and M2 based on the divided voltage, in order to provide the first voltage ELVDD at the desired voltage. As a result, first voltage ELVDD is generated at a desired voltage level.

The first and second transistors M1 and M2 may be alternately turned on during a normal driving period of first voltage supply unit 61. Accordingly, first and second transistors M1 and M2 may be have different conductivity types. For example, first transistor M1 may be an N-type transistor and second transistor M2 may be a P-type transistor, or vice versa.

The first and second transistors M1 and M2 may be maintained in an off-state during a shutdown period, during which driving of the first voltage supply unit 61 is stopped. In the shutdown period, when input voltage Vin is greater than first voltage ELVDD output from first output terminal OUT1, leakage current flows toward first output terminal OUT1 from first input terminal IN1. In this case, first switch SW1 turns off to block leakage current. Thus, leakage current does not flow from second node N2 to first output terminal OUT1.

In the shutdown period, when input voltage Vin is less than first voltage ELVDD output from first output terminal OUT1, leakage current flows toward first input terminal IN1 from first output terminal OUT1. However, leakage current is blocked by first diode D1, and thus does not flow from second node N2 to first node N1.

The input voltage Vin may be less than first voltage ELVDD during a normal driving period of first voltage supply unit 61. In this case, first switch SW1 turns on so that first voltage supply unit 61 may be driven as if first switch SW1 and second diode D2 did not exist.

To this end, first voltage supply unit 61 may include a comparator 120 which receives input voltage Vin and first voltage ELVDD and controls the on-off state of the first switch SW1 based on a comparison of input voltage Vin and first voltage ELVDD. For example, when input voltage Vin is less than first voltage ELVDD, comparator 120 turns on first switch SW1. When input voltage Vin is greater than first voltage ELVDD, comparator 120 turns off first switch SW1.

The first voltage supply unit 61 may include a first discharge resistor Rd1 and a third switch SW3, coupled in series between first output terminal OUT1 and ground. The third switch SW3 may be turned off to block current leaked through first discharge resistor Rd1.

In FIG. 3, the first discharge resistor Rd1 is coupled to first output terminal OUT1, and third switch SW3 is coupled between first discharge resistor Rd1 and ground. Alternatively, third switch SW3 may be coupled to first output terminal OUT1, and first discharge resistor Rd1 may be coupled between third switch SW3 and ground.

The first, second, and third switches SW1, SW2, and SW3 in the first voltage supply unit 61 may be formed, for example, by transistors. The on-off states of the second and third switches SW2 and SW3 may be controlled by first controller 110. As shown in FIG. 3, first voltage supply unit 61 may further include a third diode D3 coupled in parallel to first transistor M1.

Figure 4:
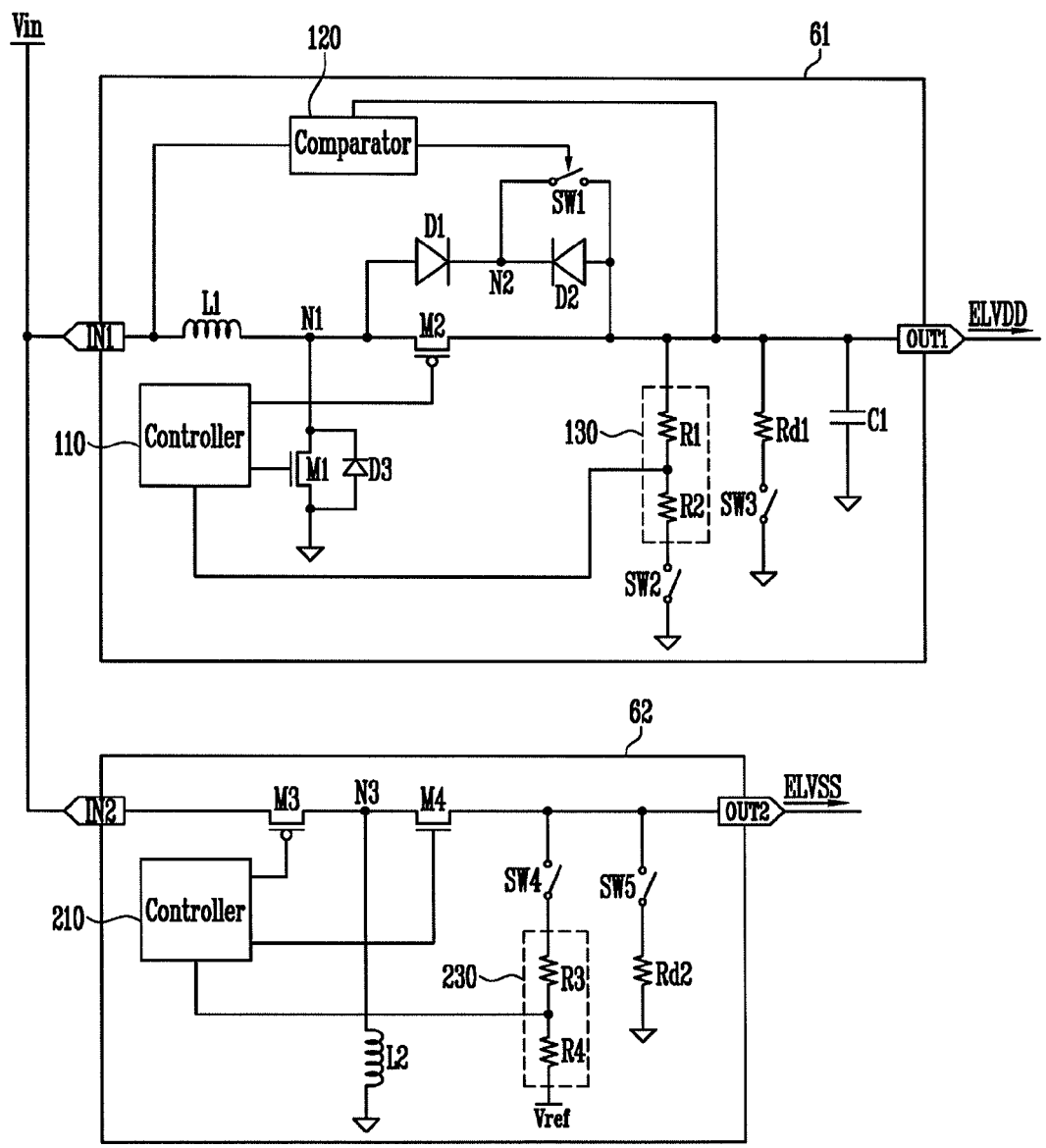
FIG. 4 illustrates an embodiment of a second voltage supply unit.

FIG. 4 illustrates an embodiment of second voltage supply unit 62, which, for example, may be an inverting buck-boost-type converter which generates a second voltage ELVSS having a negative voltage. The second voltage supply unit 62 converts input voltage Vin supplied to a second input terminal IN2 to second voltage ELVSS. The converted second voltage ELVSS is output to a second output terminal OUT2.

The second voltage supply unit 62 may include a second inductor L2, a third transistor M3, and a fourth transistor M4. The third transistor M3 is coupled between a third node N3 and second input terminal IN2, to which input voltage Vin is applied. The fourth transistor M4 is coupled between third node N3 and second output terminal OUT2. The second inductor L2 is coupled between third node N3 and ground. The third node N3 may be a common node of second inductor L2, third transistor M3, and the fourth transistor M4.

A second capacitor C2 is coupled to second output terminal OUT2 of second voltage supply unit 62. The second voltage supply unit 62 may include a second controller 210 to control on-off states of the third and fourth transistors M3 and M4. The second controller 210 controls on-off states of third and fourth transistors M3 and M4, so that input voltage Vin is converted to second voltage ELVSS at a desired voltage level.

The second voltage supply unit 62 may include a second voltage divider 230 to divide the voltage of second output terminal OUT2 (e.g., second voltage ELVSS). This divided voltage may be supplied to second controller 210. The second voltage divider 230 may include a plurality of resistors R3 and R4 coupled in series.

A fourth switch SW4 may be included to block current leaked through second voltage divider 230. For example, fourth switch SW4 may be coupled to second output terminal OUT2, and second voltage divider 230 may be coupled between fourth switch SW4 and a reference voltage Vref.

When the fourth switch SW4 turns on, second voltage divider 230 divides the voltage of second output terminal OUT2 and supplies the divided voltage to second controller 210. When fourth switch SW4 turns off, leakage current flowing from second output terminal OUT2 to reference voltage Vref, through second voltage divider 230, is blocked. The reference voltage Vref may be set to a ground or other reference voltage.

The second controller 210 controls the duty cycle ratio of third and fourth transistors M3 and M4 based on the divided voltage from second voltage divider 230, in order to generate the second voltage ELVSS at a desired voltage level.

The third and fourth transistors M3 and M4 may alternately turn on during a normal driving period of second voltage supply unit 62. Accordingly, third and fourth transistors M3 and M4 may have different conductivity types. For example, the third transistor M3 may be a P-type transistor and the fourth transistor M4 may be an N-type transistor, or vice versa.

The third and fourth transistors M3 and M4 may be maintained in an off-state during a shutdown period, in which driving of second voltage supply unit 62 is stopped.

The second voltage supply unit 62 may include a second discharge resistor Rd2 and a fifth switch SW5 coupled in series between second output terminal OUT2 and ground. The fifth switch SW5 may be turned off to block current leaked through the second discharge resistor Rd2.

In FIG. 4, the fifth switch SW5 is coupled to the second output terminal OUT2, and the second discharge resistor Rd2 is coupled between the fifth switch SW5 and ground. Alternatively, the second discharge resistor Rd2 may be coupled to the second output terminal OUT2, and the fifth switch SW5 may be coupled between the second discharge resistor Rd2 and ground.

The fourth and fifth switches SW4 and SW5 in the second voltage supply unit 62 may be transistors. The on-off states of fourth and fifth switches SW4 and SW5 may be controlled by second controller 210.

By way of summation and review, an organic light emitting display device includes a DC-DC converter which generates power sources for driving the organic light emitting display device. The power sources are generated by converting an external power source. In accordance with one or more of the aforementioned embodiments, the DC-DC converter includes a circuit which blocks leakage current, thereby minimizing power consumption caused by leakage current. Such a device, therefore, may operate at lower power consumption and therefore may be used in a variety of electronic devices, including mobile devices that operate based on a battery.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the present invention as set forth in the following claims.

What is claimed is:

1. A DC-DC converter, comprising:
a first voltage supply to convert an input voltage to a first voltage for input to a first output terminal, the first voltage supply including:
a first inductor coupled between the first input terminal and a first node;
a first transistor coupled between the first node and a reference potential;
a second transistor coupled between the first node and first output terminal;
a first diode coupled between the first node and a second node;
a second diode coupled between the second node and first output terminal;
a first switch coupled between the second node and first output terminal;
a first controller to control on-off states of the first and second transistors;
a first voltage divider configured to divide the first voltage for input to the first controller; and
a second switch coupled between the first voltage divider and reference potential.

2. The converter as claimed in claim 1, wherein:
an anode electrode of the first diode is coupled to the first node,
a cathode electrode of the first diode is coupled to the second node,
an anode electrode of the second diode is coupled to the first output terminal, and
a cathode electrode of the second diode is coupled to the second node.

3. The converter as claimed in claim 1, wherein the first voltage supply includes a first discharge resistor and a third switch coupled in series between the first output terminal and reference potential.

4. The converter as claimed in claim 1, wherein the first voltage supply includes a comparator to compare the input voltage and first voltage and to output a signal to control the on-off states of the first switch based on the comparison.

5. The converter as claimed in claim 4, wherein the comparator turns on the first switch when the input voltage is less than the first voltage and turns off the first switch when the input voltage is greater than the first voltage.

6. The converter as claimed in claim 1, further comprising:
a second voltage supply to:
convert an input voltage supplied to a second input terminal to a second voltage, and output the second voltage to a second output terminal.

7. The converter as claimed in claim 6, wherein the second voltage supply includes:
a third transistor coupled between the second input terminal and a third node;
a fourth transistor coupled between the third node and second output terminal;
a second inductor coupled between the third node and the reference potential;
a second controller to control on-off states of the third and fourth transistors;
a second voltage divider to divide the second voltage for input to the second controller; and
a fourth switch coupled between the second output terminal and second voltage divider.

8. The converter as claimed in claim 7, wherein the second voltage supply includes a second discharge resistor and a fifth switch coupled in series between the second output terminal and the reference potential.

9. The converter as claimed in claim 8, wherein the first voltage supply includes a first capacitor coupled to the first output terminal, and the second voltage supply includes a second capacitor coupled to the first output terminal.

10. An organic light emitting display device, comprising:
a plurality of pixels; and
a DC-DC converter to supply first and second voltages to each of the pixels, wherein the DC-DC converter includes:
a first voltage supply to convert an input voltage supplied to a first input terminal to a first voltage, the first voltage to be input to a first output terminal; and
a second voltage supply to convert the input voltage supplied to a second input terminal to a second voltage, the second voltage to be output to a second output terminal, wherein the first voltage supply includes:
a first inductor coupled between the first input terminal and a first node;
a first transistor coupled between the first node and a reference potential;
a second transistor coupled between the first node and first output terminal;
a first diode coupled between the first node and a second node;
a second diode coupled between the second node and first output terminal;
a first switch coupled between the second node and first output terminal;
a first controller to control on-off states of the first and second transistors;
a first voltage divider to divide the first voltage for input to the first controller; and
a second switch coupled between the first voltage divider and reference potential.

11. The display device as claimed in claim 10, wherein:
an anode electrode of the first diode is coupled to the first node,
a cathode electrode of the first diode is coupled to the second node,
an anode electrode of the second diode is coupled to the first output terminal, and
a cathode electrode of the second diode is coupled to the second node.

12. The display device as claimed in claim 10, wherein the first voltage supply includes a first discharge resistor and a third switch coupled in series between the first output terminal and the ground.

13. The display device as claimed in claim 10, wherein the DC-DC converter includes:
a first capacitor coupled to the first output terminal; and
a second capacitor coupled to the second output terminal.

14. The display device as claimed in claim 10, wherein the first voltage supply includes a comparator to compare the input voltage and first voltage, and to control an on-off state of the first switch based on the comparison.

15. The display device as claimed in claim 14, wherein the comparator:
turns on the first switch when the input voltage is less than the first voltage, and
turns off the first switch when the input voltage is greater than the first voltage.

16. The display device as claimed in claim 10, wherein the second voltage supply unit includes:
a third transistor coupled between the second input terminal and a third node;
a fourth transistor coupled between the third node and the second output terminal;
a second inductor coupled between the third node and the reference potential;
a second controller to control on-off states of the third and fourth transistors;
a second voltage divider to divide the second voltage for input to the second controller; and
a fourth switch coupled between the second output terminal and second voltage divider.

17. The display device as claimed in claim 16, wherein the second voltage supply unit includes a second discharge resistor and a fifth switch coupled in series between the second output terminal and the ground.

18. A controller for an organic light emitting display device, the controller comprising:
a voltage converter to convert an input voltage to an output voltage, the voltage converter including:
an inductor;
a driving transistor connected to the inductor, the driving transistor for driving a current flowing from the input voltage to the inductor;
a voltage divider to divide the output voltage, the voltage divider including a resistor and a switch being connected in series between the output voltage and a reference potential; and
a controller to receive the divided output voltage from the voltage divider and to control the current flowing from the input voltage to the inductor by controlling on-off states of the driving transistor based on the divided output voltage.

19. The controller as claimed in claim 18, wherein
the switch of the voltage divider is for blocking leakage current flowing through the voltage divider.

* * * * *